(12) United States Patent
Yu et al.

(10) Patent No.: US 10,271,392 B2
(45) Date of Patent: Apr. 23, 2019

(54) LLC BACKLIGHT DRIVING CONTROL CIRCUIT

(71) Applicant: SHENZHEN CHINA STAR OPTOELECTRONICS TECHNOLOGY CO., LTD, Shenzhen, Guangdon (CN)

(72) Inventors: Xuekun Yu, Shenzhen (CN); Wendong Li, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/578,146

(22) PCT Filed: Aug. 8, 2017

(86) PCT No.: PCT/CN2017/096422
§ 371 (c)(1),
(2) Date: Nov. 29, 2017

(87) PCT Pub. No.: WO2018/209823
PCT Pub. Date: Nov. 22, 2018

(65) Prior Publication Data
US 2018/0338357 A1 Nov. 22, 2018

(30) Foreign Application Priority Data
May 16, 2017 (CN) .......................... 2017 1 0346959

(51) Int. Cl.
*H05B 37/02* (2006.01)
*H05B 33/08* (2006.01)
(Continued)

(52) U.S. Cl.
CPC ........ *H05B 33/0815* (2013.01); *H02M 3/337* (2013.01); *H02M 3/33561* (2013.01);
(Continued)

(58) Field of Classification Search
CPC ........................ H05B 33/0848; H05B 33/0851
(Continued)

(56) References Cited

U.S. PATENT DOCUMENTS

| 8,288,961 | B2 * | 10/2012 | Chen | .................... G09G 3/3406 315/222 |
| 2013/0285565 | A1 * | 10/2013 | Feng | .................. H05B 33/0839 315/186 |
| 2015/0002042 | A1 | 1/2015 | Kim et al. | |

FOREIGN PATENT DOCUMENTS

| CN | 201774717 U | 3/2011 |
| CN | 202210400 U | 5/2012 |

(Continued)

*Primary Examiner* — Thuy V Tran
(74) *Attorney, Agent, or Firm* — Kirton McConkie; Evan R. Witt

(57) ABSTRACT

An LLC backlight driving control circuit is disclosed and includes an LLC resonant converter circuit configured to drive a current to alter periodically; a rectifying and filtering circuit configured to balance a light bar voltage difference; a control circuit configured to implement a constant current feedback; and two paths of LED light bars configured to provide LED backlight. The LLC resonant converter circuit, the rectifying and filtering circuit, the two paths of LED light bars, and the control circuit are connected in sequence to form a loop circuit. The LLC resonant converter circuit inputs a power supply current to the two paths of LED light bars and controls an output duty cycle of the LLC resonant converter circuit by acquiring a current flowing through a sampling resistor, thereby controlling a voltage that is outputted to the two paths of LED light bars.

7 Claims, 2 Drawing Sheets

(51) Int. Cl.
*H02M 3/335* (2006.01)
*H02M 3/337* (2006.01)
*H02M 7/48* (2007.01)

(52) U.S. Cl.
CPC .......... *H02M 3/33569* (2013.01); *H02M 2007/4815* (2013.01); *H05B 33/0848* (2013.01); *H05B 33/0851* (2013.01)

(58) Field of Classification Search
USPC .......................................... 315/291; 345/102
See application file for complete search history.

(56) References Cited

FOREIGN PATENT DOCUMENTS

| CN | 202424530 U | 9/2012 |
|----|-------------|--------|
| CN | 102833912 A | 12/2012 |
| CN | 202889738 U | 4/2013 |
| CN | 103874288 A | 6/2014 |
| CN | 105096840 A | 11/2015 |
| CN | 106255266 A | 12/2016 |
| CN | 106304492 A | 1/2017 |
| CN | 205946261 U | 2/2017 |

* cited by examiner

LLC BACKLIGHT DRIVING CONTROL CIRCUIT

BACKGROUND

Field

The present disclosure relates to a technological field of liquid crystal displays, and more particularly to a method and a device for driving an organic light emitting diode display device.

Background

With the continuous increasing of luminous efficiency of LEDs, more and more large-sized LED televisions adopt backlight modules including two LED light bars or four LED light bars to reduce the cost of the backlight modules of the LED televisions.

In a large-sized backlight scheme including two light bars, a two-path BOOST topology is utilized to achieve constant current dimming control of the light bars. In a large-sized backlight scheme including four light bars, a four-path BOOST topology is utilized to achieve constant current dimming control of the light bars.

However, in a two-path BOOST system, power devices which a backlight module at least needs include two boost inductors, two boost MOS transistors, two Schottky diodes, and two high output voltage electrolytic capacitors. Similarly, in a four-path BOOST system, power devices which a backlight module at least needs include four boost inductors, four boost MOS transistors, four Schottky diodes, and four high output voltage electrolytic capacitors. Accordingly, when the number of the power devices increased, the cost of the system is increased. Furthermore, when the number of the power devices increased, losses are also increased, so that efficiency of the system is decreased. Moreover, an area of a printed circuit board should be increased to support more components.

Consequently, there is a need to improve the prior art.

SUMMARY OF THE DISCLOSURE

An objective of the present disclosure is to provide an LLC backlight driving control circuit capable of decreasing power components, improving system efficiency, and decreasing system cost by adopting LLC resonance to directly drive two paths of LED light bars without a BOOST structure.

The present disclosure provides an LLC backlight driving control circuit. The LLC backlight driving control circuit includes an LLC resonant converter circuit configured to drive a current to alter periodically; a rectifying and filtering circuit configured to balance a light bar voltage difference; a control circuit configured to implement a constant current feedback; and two paths of LED light bars configured to provide LED backlight. The LLC resonant converter circuit, the rectifying and filtering circuit, the two paths of LED light bars, and the control circuit are connected in sequence to form a loop circuit. The LLC resonant converter circuit inputs a power supply current to the two paths of LED light bars and controls an output duty cycle of the LLC resonant converter circuit by acquiring a current flowing through a sampling resistor, thereby controlling a voltage that is outputted to the two paths of LED light bars.

In one embodiment of the present disclosure, the LLC resonant converter circuit includes a first diode, a first capacitor, a second diode, a drive isolation transformer, a MOS transistor of an LLC upper-half bridge, a MOS transistor of an LLC lower-half bridge, a second capacitor, and an LLC resonant transformer. A positive terminal of the first diode is grounded. A negative terminal of the first diode is electrically coupled to one terminal of the first capacitor and one output terminal of the control circuit. The other terminal of the first capacitor is electrically coupled to one terminal of the drive isolation transformer. A positive terminal of the second diode is grounded. A negative terminal of the second diode is electrically coupled to another terminal of the drive isolation transformer and the other output terminal of the control circuit. Another terminal of the drive isolation transformer is electrically coupled to one terminal of the MOS transistors of the upper-half bridge and the lower-half bridge. Another terminal of the MOS transistors of the upper-half bridge and the lower-half bridge is electrically coupled to another terminal of the LLC resonant transformer and one terminal of the second capacitor. The other terminal of the second capacitor is electrically coupled to another terminal of the LLC resonant transformer. Another terminal of the LLC resonant transformer is electrically coupled to an input terminal of the rectifying and filtering circuit.

In one embodiment of the present disclosure, the MOS transistors of the LLC upper-half bridge and the LLC lower-half bridge includes a first resistor, a second resistor, a third resistor, a fourth resistor, a third diode, a fourth diode, a fifth resistor, a sixth resistor, the MOS transistor of the LLC upper-half bridge, and the MOS transistor of the LLC lower-half bridge. One terminal of the first resistor is electrically coupled to another terminal of the drive isolation transformer. The other terminal of the first resistor is electrically coupled to one terminal of the third resistor and a negative terminal of the third diode. One terminal of the second resistor is electrically coupled to another terminal of the drive isolation transformer. The other terminal of the second resistor is electrically coupled to one terminal of the fourth resistor and a negative terminal of the fourth diode. The third resistor is parallel with the third diode. The fourth resistor is parallel with the fourth diode. One terminal of the fifth resistor is electrically coupled to the other terminal of the third resistor, a positive terminal of the third diode, and a gate of the MOS transistor of the LLC upper-half bridge. The other terminal of the fifth resistor is electrically coupled to another terminal of the drive isolation transformer, a source of the MOS transistor of the LLC upper-half bridge, and a drain of the MOS transistor of the LLC lower-half bridge. One terminal of the sixth resistor is electrically coupled to the other terminal of the fourth resistor, a positive terminal of the fourth diode, and a gate of the MOS transistor of the LLC lower-half bridge. The other terminal of the sixth resistor is electrically coupled to another terminal of the drive isolation transformer and a source of the MOS transistor of the LLC lower-half bridge and grounded. The source of the MOS transistor of the LLC upper-half bridge is electrically coupled to the drain of the MOS transistor of the LLC lower-half bridge. A drain of the MOS transistor of the LLC upper-half bridge is electrically coupled to a PFC output.

In one embodiment of the present disclosure, the rectifying and filtering circuit includes a third capacitor, a fifth diode, a sixth diode, a seventh diode, an eighth diode, a fourth capacitor, and a fifth capacitor. One terminal of the third capacitor is electrically coupled to an output terminal of the LLC resonant converter circuit. The other terminal of the third capacitor is electrically coupled to a negative terminal of the fifth diode and a positive terminal of the sixth diode. One terminal of the fourth capacitor is electrically coupled to a negative terminal of the sixth diode and is electrically coupled to the two paths of LED light bars via a first connector. The other terminal of the fourth capacitor is grounded. One terminal of the fifth capacitor is electrically coupled to a negative terminal of the seventh diode and is electrically coupled to the two paths of LED light bars via a second connector. The other terminal of the fifth capacitor is electrically coupled to a positive terminal of the eighth diode and is electrically coupled to the two paths of LED light bars via the second connector.

In one embodiment of the present disclosure, the third capacitor is a capacitor for balancing the light bar voltage difference. The fifth diode, the sixth diode, the seventh diode, and the eighth diode are output bridge rectifier diodes. The fourth capacitor and the fifth capacitor are output filter capacitors.

In one embodiment of the present disclosure, the control circuit includes a seventh resistor and a controller. The seventh resistor is a current sampling resistor. One terminal of the seventh resistor is electrically coupled to one terminal of the controller and is electrically coupled to the two paths of LED light bars via the first connector. The other terminal of the seventh resistor is grounded. The other terminal of the controller is electrically coupled to an input terminal of the LLC resonant converter circuit.

In one embodiment of the present disclosure, the controller acquires an LED current by a voltage of the seventh resistor and adjusts an output signal of the controller, so as to adjust an output of the LLC resonant converter circuit.

The LLC backlight driving control circuit of the present disclosure simplifies a backlight driving structure, improves system efficiency, and decreasing system cost by optimizing a backlight driving topology and adopting the LLC resonance to directly drive the two paths of LED light bars.

In the method for driving the organic light emitting diode display device, calculating the equivalent voltage according to each of the currents flowing through each of the organic light emitting diodes includes:

In the method and the device for driving the organic light emitting diode display device, the power consumption can be reduced by calculating the voltage of the gate of the driving thin film transistor in the light emitting stage in each frame of an image, and controlling the positive voltage of the power source inputted to the organic light emitting diode display device according to the voltage of the gate of the driving thin film transistor.

DETAILED DESCRIPTION OF THE PREFERRED EMBODIMENTS

A specific embodiment of an LLC backlight driving control circuit provided by the present disclosure is described in conjunction with drawings as follows.

Figure 1:
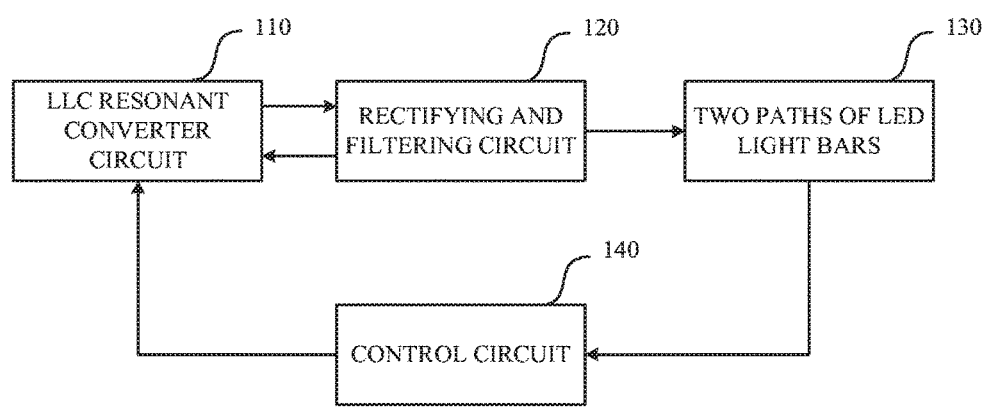
FIG. 1 illustrates a block diagram of an LLC backlight driving control circuit in accordance with an embodiment of the present disclosure.
Figure 2:
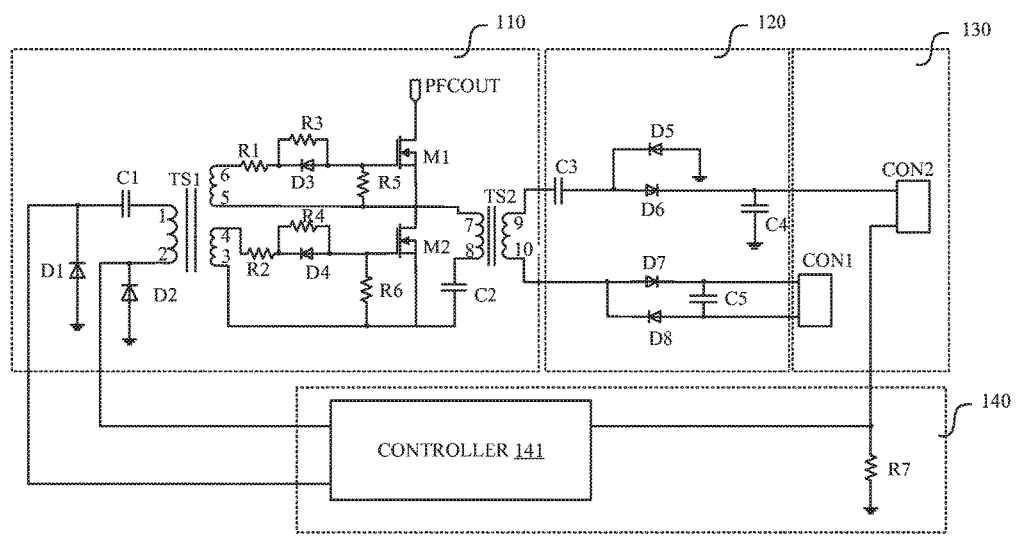
FIG. 2 illustrates a specific circuit diagram of the LLC backlight driving control circuit in accordance with the embodiment of the present disclosure.

Please refer to FIG. 1 and FIG. 2. The LLC (a resonant converter circuit) backlight driving control circuit provided by the present disclosure includes an LLC resonant converter circuit 110 configured to drive a current to alter periodically; a rectifying and filtering circuit 120 configured to balance a light bar voltage difference; a control circuit 140 configured to implement a constant current feedback; and two paths of LED light bars 130 configured to provide LED backlight. The LLC resonant converter circuit 110, the rectifying and filtering circuit 120, the two paths of LED light bars 130, and the control circuit 140 are connected in sequence to form a loop circuit. The LLC resonant converter circuit 110 inputs a power supply current to the two paths of LED light bars 130 and controls an output duty cycle of the LLC resonant converter circuit 110 by acquiring a current flowing through a sampling resistor, thereby controlling a voltage that is outputted to the two paths of LED light bars 130.

In detail, in an embodiment of the present disclosure, a first capacitor C1 of the LLC resonant converter circuit 110 drives, according to a feedback current of the control circuit 140, the current in a MOS transistor M1 of an LLC upper-half bridge and a MOS transistor M2 of an LLC lower-half bridge to alter periodically via a drive isolation transformer TS1. When the current is in a positive half cycle, the MOS transistor M1 of the LLC upper-half bridge is turned on. When the current is in a negative half cycle, the MOS transistor M2 of the LLC lower-half bridge is turned on. A structural connection relationship of the LLC resonant converter circuit 110 is described in detail as follows.

The LLC resonant converter circuit 110 includes a first diode D1, the first capacitor C1, a second diode D2, the drive isolation transformer TS1, the MOS transistor M1 of the LLC upper-half bridge, the MOS transistor M2 of the LLC lower-half bridge, a second capacitor C2, and an LLC resonant transformer TS2. A positive terminal of the first diode D1 is grounded. A negative terminal of the first diode D1 is electrically coupled to one terminal of the first capacitor C1 and one output terminal of the control circuit 140. The other terminal of the first capacitor C1 is electrically coupled to one terminal (pin 1 of the drive isolation transformer TS1 as shown in FIG. 2) of the drive isolation transformer TS1. A positive terminal of the second diode D2 is grounded. A negative terminal of the second diode D2 is electrically coupled to another terminal (pin 2 of the drive isolation transformer TS1 as shown in FIG. 2) of the drive isolation transformer TS1 and the other output terminal of the control circuit 140. Another terminal (pin 5 of the drive isolation transformer TS1 as shown in FIG. 2) of the drive isolation transformer TS1 is electrically coupled to one terminal of the MOS transistors of the upper-half bridge and the lower-half bridge. Another terminal of the MOS transistors of the upper-half bridge and the lower-half bridge is electrically coupled to another terminal (pin 7 of the LLC resonant transformer TS2 as shown in FIG. 2) of the LLC resonant transformer TS2 and one terminal of the second capacitor C2. The other terminal of the second capacitor C2 is electrically coupled to another terminal (pin 8 of the LLC resonant transformer TS2 as shown in FIG. 2) of the LLC resonant transformer TS2. Another terminal of the LLC resonant transformer TS2 is electrically coupled to an input terminal of the rectifying and filtering circuit 120. In the present embodiment, the drive isolation transformer TS1 is a 1:1:1 transformer. The first diode D1 and the second diode D2 are BAT54 diodes. The first capacitor C1 is a 1μF capacitor.

The first diode D1 and the second diode D2 are preferred elements. A two-path driving of the control circuit 140 is electrically coupled to the MOS transistor M1 of the LLC upper-half bridge and the MOS transistor M2 of the LLC lower-half bridge via the drive isolation transformer TS1 and the first capacitor C1. Furthermore, a dangerous factor of LC resonance exists, and thus a driving voltage might be too high. In the present embodiment, disposing the first diode D1 and the second diode D2 can limit gate driving voltages of the MOS transistor M1 of the LLC upper-half bridge and the MOS transistor M2 of the LLC lower-half bridge, thereby ensuring the safety and the stability of the circuit.

In the present embodiment, the MOS transistors of the LLC upper-half bridge and the LLC lower-half bridge include a first resistor R1, a second resistor R2, a third resistor R3, a fourth resistor R4, a third diode D3, a fourth diode D4, a fifth resistor R5, a sixth resistor R6, the MOS transistor M1 of the LLC upper-half bridge, and the MOS transistor M2 of the LLC lower-half bridge. One terminal of the first resistor R1 is electrically coupled to a pin 6 of the drive isolation transformer TS1. The other terminal of the first resistor R1 is electrically coupled to one terminal of the third resistor R3 and a negative terminal of the third diode D3. One terminal of the second resistor R2 is electrically coupled to a pin 4 of the drive isolation transformer TS1. The other terminal of the second resistor R2 is electrically coupled to one terminal of the fourth resistor R4 and a negative terminal of the fourth diode D4. The third resistor R3 is parallel with the third diode D3. The fourth resistor R4 is parallel with the fourth diode D4. One terminal of the fifth resistor R5 is electrically coupled to the other terminal of the third resistor R3, a positive terminal of the third diode D3, and a gate of the MOS transistor M1 of the LLC upper-half bridge. The other terminal of the fifth resistor R5 is electrically coupled to the pin 5 of the drive isolation transformer TS1, a source of the MOS transistor M1 of the LLC upper-half bridge, and a drain of the MOS transistor M2 of the LLC lower-half bridge. One terminal of the sixth resistor R6 is electrically coupled to the other terminal of the fourth resistor R4, a positive terminal of the fourth diode D4, and a gate of the MOS transistor M2 of the LLC lower-half bridge. The other terminal of the sixth resistor R6 is electrically coupled to a pin 3 of the drive isolation transformer TS1 and a source of the MOS transistor M2 of the LLC lower-half bridge and grounded. The source of the MOS transistor M1 of the LLC upper-half bridge is electrically coupled to the drain of the MOS transistor M2 of the LLC lower-half bridge. A drain of the MOS transistor M1 of the LLC upper-half bridge is electrically coupled to a PFC output (i.e., PFCOUT). In the present embodiment, the third diode D3 and the fourth diode D4 are 1N4148 types. The MOS transistor M1 of the LLC upper-half bridge and the MOS transistor M2 of the LLC lower-half bridge are 12N60 MOS transistors. The first resistor R1 and the second resistor R2 are 10Ω resistors. The third resistor R3 and the fourth resistor R4 are 47Ω resistors. The fifth resistor R5 and the sixth resistor R6 are 10 KΩ resistors. The second capacitor C2 is a 33 nF/1000V capacitor.

In the MOS transistors of the LLC upper-half bridge and the LLC lower-half bridge, the third resistor R3, the fourth resistor R4, the third diode D3, and the fourth diode D4 form a discharging circuit. In the prior art, when the MOS transistors of the LLC upper-half bridge and the LLC lower-half bridge are turned off, parasitic capacitances (Cgs) exist between the gates and the sources. Accordingly, voltages of the gates of the LLC upper-half bridge and the LLC lower-half bridge are not decreased to zero rapidly. That is, the MOS transistors of the LLC upper-half bridge and the LLC lower-half bridge are still turned on for a while. In the present embodiment of the present disclosure, because the discharging circuit is formed, the parasitic capacitances between the gates and the sources of the LLC upper-half bridge and the LLC lower-half bridge can be discharged via the third diode D3 and the fourth diode D4, thereby decreasing risk of turning on the MOS transistor M1 of the LLC upper-half bridge and the MOS transistor M2 of the LLC lower-half bridge mistakenly.

Please still refer to FIG. 1 and FIG. 2. The rectifying and filtering circuit 120 includes a third capacitor C3, a fifth diode D5, a sixth diode D6, a seventh diode D7, an eighth diode D8, a fourth capacitor C4, and a fifth capacitor C5. One terminal of the third capacitor C3 is electrically coupled to an output terminal of the LLC resonant converter circuit 110. The other terminal of the third capacitor C3 is electrically coupled to a negative terminal of the fifth diode D5 and a positive terminal of the sixth diode D6. One terminal of the fourth capacitor C4 is electrically coupled to a negative terminal of the sixth diode D6 and is electrically coupled to a first path of LED light bar (not shown) via a first connector CON1. The other terminal of the fourth capacitor C4 is grounded. One terminal of the fifth capacitor C5 is electrically coupled to a negative terminal of the seventh diode D7 and is electrically coupled to a second path of LED light bar (not shown) via a second connector CON2. The other terminal of the fifth capacitor C5 is electrically coupled to a positive terminal of the eighth diode D8 and is electrically coupled to the second LED light bar (not shown) via the second connector CON2. In the present embodiment, the third capacitor C3, the fourth capacitor C4, and the fifth capacitor C5 are 1 µF capacitors. The fifth diode D5, the sixth diode D6, the seventh diode D7, and the eighth diode D8 are 600V/4 A diodes.

In the present embodiment, the third capacitor C3 may be a capacitor for balancing the light bar voltage difference. The fifth diode D5, the sixth diode D6, the seventh diode D7, and the eighth diode D8 are output bridge rectifier diodes. The fourth capacitor C4 and the fifth capacitor C5 are output filter capacitors.

In the circuit, the light bar voltage difference between the two paths of LED light bars 130 can be balanced by the third capacitor C3. When the voltages of the two paths of LED light bars 130 are the same, charging and discharging of the third capacitor C3 are balanced. The voltage of the third capacitor C3 is zero. When the light bar voltage difference exists between the two paths of LED light bars 130 and the voltage of the second path of LED light bar is greater than the voltage of the first LED light bar, a negative voltage is at the left terminal of the third capacitor C3, and a positive voltage is at the right terminal of the third capacitor C3. As such, when the first path of LED light bar is turned on, energy is stored in the third capacitor C3. When the second path of LED light bar is turned on, the energy is released by the third capacitor C3. When the voltage of the second path of LED light bar is smaller than the voltage of the first LED light bar, a positive voltage is at the left terminal of the third capacitor C3, and a negative voltage is at the right terminal of the third capacitor C3. As such, when the first path of LED light bar is turned on, energy is released by the third capacitor C3. When the second path of LED light bar is turned on, the energy is stored in the third capacitor C3.

The control circuit 140 includes a seventh resistor R7 and a controller 141. The seventh resistor R7 is a current sampling resistor. One terminal of the seventh resistor R7 is electrically coupled to one terminal of the controller 141 and is electrically coupled to the two paths of LED light bars 130 via the first connector CON1. The other terminal of the seventh resistor R7 is grounded. The other terminal of the controller 141 is electrically coupled to an input terminal of the LLC resonant converter circuit 110.

Further, an operating principle of the circuit achieving constant current control in the present embodiment is described in conjunction with FIG. 1 and FIG. 2.

When the LLC resonant transformer TS2 is in a positive half cycle, the current is inputted to one terminal (the pin 7 of the LLC resonant transformer TS2 as shown in FIG. 2) of the LLC resonant transformer TS2. A secondary current is outputted from another terminal (a pin 10 of the LLC resonant transformer TS2 as shown in FIG. 2) of the LLC resonant transformer TS2 to turn on seventh diode D7 to charge the fifth capacitor C5. Then, the first path of LED bar is turned on via the first connector CON1. The third capacitor C3 is discharged, and the current flows to another terminal (a pin 9 of the LLC resonant transformer TS2 as shown in FIG. 2) of the LLC resonant transformer TS2. When the LLC resonant transformer TS2 is in a negative half cycle, the secondary current flows from the another terminal (the pin 9 of the LLC resonant transformer TS2 as shown in FIG. 2) of the LLC resonant transformer TS2 to charge the third capacitor C3 and to charge the fourth capacitor C4 via the sixth diode D6. Then, the second path of LED bar is turned on via the second connector CON2. The current flowing through the second path of LED light bar, the seventh resistor R7, and the eighth diode D8 returns to the another terminal (the pin 10 of the LLC resonant transformer TS2 as shown in FIG. 2) of the LLC resonant transformer TS2. As such, a cycle loop is formed. The cycle loop implements the first path of LED light bar and the second path of LED light bar. That is, in one cycle, the current of the LLC resonant transformer TS2 in the positive half cycle is the same the current in the negative half cycle. Accordingly, only one of the currents flowing through the two paths of LED light bars requires to be sampled. The other one of the two paths of LED light bars can be ensured to have the same constant current. Furthermore, the circuit of the present disclosure does not adopt a BOOST circuit, and thus the problems of significant losses and high manufacturing cost does not occur.

According to the above-mentioned descriptions, the controller 141 acquires an LED current by the voltage of the seventh resistor R7 and adjusts an output signal of the controller 141, so as to adjust the output of the LLC resonant converter circuit 110. That is, the controller 141 correspondingly changes the output of the output of the LLC resonant converter circuit 110 by detecting the voltage of the seventh resistor R7. Accordingly, a gain of the loop can be changed to implement the constant current. When the voltage of the sampling resistor (i.e., the seventh resistor R7) is greater than a predetermined threshold, the controller 141 outputs a signal to decrease the output duty cycle of the drive isolation transformer TS1. When the voltage of the sampling resistor is smaller than or equal to the predetermined threshold, the controller 141 outputs another signal to increase the output duty cycle of the drive isolation transformer TS1. That is, the output duty cycle of the drive isolation transformer TS1 is controlled by the controller 141.

When the output duty cycle of the drive isolation transformer TS1 is changed, the output voltage of the LLC resonant transformer TS2 is finely tuned. The output voltage of the LLC resonant transformer TS2 outputted to the two paths of LED light bars is changed by primary turns (NP), secondary turns (NS), and a leakage inductance (LR). The leakage inductance (LR) is parasitic in the LLC resonant transformer TS2 and adjusted by coupling a primary winding with a secondary winding.

Furthermore, the above-mentioned implementation manner can effectively solve the problem of a constant current dimming control system in a two-path BOOST topology in the prior art. The operating principle in accordance with the above-mentioned embodiment of the present disclosure can be utilized in a four-path LED backlight driving control circuit and is not repeated herein.

The above descriptions are merely the specific embodiments of the present disclosure, but the protection scope of the present disclosure is not limited thereto, anyone skilled who is familiar with this art could readily conceive variations or substitutions within the technical scope disclosed by the present disclosure, and these variations or substitutions shall be encompassed in the protection scope of the present disclosure. Thus, the protection scope of the present disclosure shall be subjected to the protection scope of the claims.

What is claimed is:

1. An LLC backlight driving control circuit, comprising:
an LLC resonant converter circuit configured to drive a current to alter periodically;
a rectifying and filtering circuit configured to balance a light bar voltage difference;
a control circuit configured to implement a constant current feedback; and
two paths of LED light bars configured to provide LED backlight,
wherein the LLC resonant converter circuit, the rectifying and filtering circuit, the two paths of LED light bars, and the control circuit are connected in sequence to form a loop circuit;
the LLC resonant converter circuit inputs a power supply current to the two paths of LED light bars and controls an output duty cycle of the LLC resonant converter circuit by acquiring a current flowing through a sampling resistor, thereby controlling a voltage that is outputted to the two paths of LED light bars;
the LLC resonant converter circuit comprises a first diode, a first capacitor, a second diode, a drive isolation transformer, a MOS transistor of an LLC upper-half bridge, a MOS transistor of an LLC lower-half bridge, a second capacitor, and an LLC resonant transformer;
a positive terminal of the first diode is grounded, a negative terminal of the first diode is electrically coupled to one terminal of the first capacitor and one output terminal of the control circuit, the other terminal of the first capacitor is electrically coupled to one terminal of the drive isolation transformer, a positive terminal of the second diode is grounded, a negative terminal of the second diode is electrically coupled to another terminal of the drive isolation transformer and the other output terminal of the control circuit, another terminal of the drive isolation transformer is electrically coupled to one terminal of the MOS transistors of the upper-half bridge and the lower-half bridge, another terminal of the MOS transistors of the upper-half bridge and the lower-half bridge is electrically coupled to another terminal of the LLC resonant transformer and one terminal of the second capacitor, the other terminal of the second capacitor is electrically coupled to another terminal of the LLC resonant transformer, another terminal of the LLC resonant transformer is electrically coupled to an input terminal of the rectifying and filtering circuit;
the MOS transistors of the LLC upper-half bridge and the LLC lower-half bridge comprise a first resistor, a second resistor, a third resistor, a fourth resistor, a third diode, a fourth diode, a fifth resistor, a sixth resistor, the MOS transistor of the LLC upper-half bridge, and the MOS transistor of the LLC lower-half bridge;

one terminal of the first resistor is electrically coupled to another terminal of the drive isolation transformer, the other terminal of the first resistor is electrically coupled to one terminal of the third resistor and a negative terminal of the third diode, one terminal of the second resistor is electrically coupled to another terminal of the drive isolation transformer, the other terminal of the second resistor is electrically coupled to one terminal of the fourth resistor and a negative terminal of the fourth diode, the third resistor is parallel with the third diode, the fourth resistor is parallel with the fourth diode, one terminal of the fifth resistor is electrically coupled to the other terminal of the third resistor, a positive terminal of the third diode, and a gate of the MOS transistor of the LLC upper-half bridge, the other terminal of the fifth resistor is electrically coupled to another terminal of the drive isolation transformer, a source of the MOS transistor of the LLC upper-half bridge, and a drain of the MOS transistor of the LLC lower-half bridge, one terminal of the sixth resistor is electrically coupled to the other terminal of the fourth resistor, a positive terminal of the fourth diode, and a gate of the MOS transistor of the LLC lower-half bridge, the other terminal of the sixth resistor is electrically coupled to another terminal of the drive isolation transformer and a source of the MOS transistor of the LLC lower-half bridge and grounded, the source of the MOS transistor of the LLC upper-half bridge is electrically coupled to the drain of the MOS transistor of the LLC lower-half bridge, a drain of the MOS transistor of the LLC upper-half bridge is electrically coupled to a PFC output;

the rectifying and filtering circuit comprises a third capacitor, a fifth diode, a sixth diode, a seventh diode, an eighth diode, a fourth capacitor, and a fifth capacitor;

one terminal of the third capacitor is electrically coupled to an output terminal of the LLC resonant converter circuit, the other terminal of the third capacitor is electrically coupled to a negative terminal of the fifth diode and a positive terminal of the sixth diode, one terminal of the fourth capacitor is electrically coupled to a negative terminal of the sixth diode and is electrically coupled to the two paths of LED light bars via a first connector, the other terminal of the fourth capacitor is grounded, one terminal of the fifth capacitor is electrically coupled to a negative terminal of the seventh diode and is electrically coupled to the two paths of LED light bars via a second connector, the other terminal of the fifth capacitor is electrically coupled to a positive terminal of the eighth diode and is electrically coupled to the two paths of LED light bars via the second connector;

the control circuit comprises a seventh resistor and a controller;

the seventh resistor is a current sampling resistor, one terminal of the seventh resistor is electrically coupled to one terminal of the controller and is electrically coupled to the two paths of LED light bars via the first connector, the other terminal of the seventh resistor is grounded, the other terminal of the controller is electrically coupled to an input terminal of the LLC resonant converter circuit;

the controller acquires an LED current by a voltage of the seventh resistor and adjusts an output signal of the controller, so as to adjust an output of the LLC resonant converter circuit.

2. An LLC backlight driving control circuit, comprising:
an LLC resonant converter circuit configured to drive a current to alter periodically;
a rectifying and filtering circuit configured to balance a light bar voltage difference;
a control circuit configured to implement a constant current feedback; and
two paths of LED light bars configured to provide LED backlight,
wherein the LLC resonant converter circuit, the rectifying and filtering circuit, the two paths of LED light bars, and the control circuit are connected in sequence to form a loop circuit;
the LLC resonant converter circuit inputs a power supply current to the two paths of LED light bars and controls an output duty cycle of the LLC resonant converter circuit by acquiring a current flowing through a sampling resistor, thereby controlling a voltage that is outputted to the two paths of LED light bars,
wherein the LLC resonant converter circuit comprises a first diode, a first capacitor, a second diode, a drive isolation transformer, a MOS transistor of an LLC upper-half bridge, a MOS transistor of an LLC lower-half bridge, a second capacitor, and an LLC resonant transformer;
a positive terminal of the first diode is grounded, a negative terminal of the first diode is electrically coupled to one terminal of the first capacitor and one output terminal of the control circuit, the other terminal of the first capacitor is electrically coupled to one terminal of the drive isolation transformer, a positive terminal of the second diode is grounded, a negative terminal of the second diode is electrically coupled to another terminal of the drive isolation transformer and the other output terminal of the control circuit, another terminal of the drive isolation transformer is electrically coupled to one terminal of the MOS transistors of the upper-half bridge and the lower-half bridge, another terminal of the MOS transistors of the upper-half bridge and the lower-half bridge is electrically coupled to another terminal of the LLC resonant transformer and one terminal of the second capacitor, the other terminal of the second capacitor is electrically coupled to another terminal of the LLC resonant transformer, another terminal of the LLC resonant transformer is electrically coupled to an input terminal of the rectifying and filtering circuit.

3. The LLC backlight driving control circuit of claim 2, wherein the MOS transistors of the LLC upper-half bridge and the LLC lower-half bridge comprise a first resistor, a second resistor, a third resistor, a fourth resistor, a third diode, a fourth diode, a fifth resistor, a sixth resistor, the MOS transistor of the LLC upper-half bridge, and the MOS transistor of the LLC lower-half bridge;

one terminal of the first resistor is electrically coupled to another terminal of the drive isolation transformer, the other terminal of the first resistor is electrically coupled to one terminal of the third resistor and a negative terminal of the third diode, one terminal of the second resistor is electrically coupled to another terminal of the drive isolation transformer, the other terminal of the second resistor is electrically coupled to one terminal of the fourth resistor and a negative terminal of the fourth diode, the third resistor is parallel with the third diode, the fourth resistor is parallel with the fourth diode, one terminal of the fifth resistor is electrically coupled to the other terminal of the third resistor, a positive terminal of the third diode, and a gate of the MOS transistor of the LLC upper-half bridge, the other terminal of the fifth resistor is electrically coupled to another terminal of the drive isolation transformer, a source of the MOS transistor of the LLC upper-half bridge, and a drain of the MOS transistor of the LLC lower-half bridge, one terminal of the sixth resistor is electrically coupled to the other terminal of the fourth resistor, a positive terminal of the fourth diode, and a gate of the MOS transistor of the LLC lower-half bridge, the other terminal of the sixth resistor is electrically coupled to another terminal of the drive isolation transformer and a source of the MOS transistor of the LLC lower-half bridge and grounded, the source of the MOS transistor of the LLC upper-half bridge is electrically coupled to the drain of the MOS transistor of the LLC lower-half bridge, a drain of the MOS transistor of the LLC upper-half bridge is electrically coupled to a PFC output.

4. The LLC backlight driving control circuit of claim 2, wherein the rectifying and filtering circuit comprises a third capacitor, a fifth diode, a sixth diode, a seventh diode, an eighth diode, a fourth capacitor, and a fifth capacitor;
one terminal of the third capacitor is electrically coupled to an output terminal of the LLC resonant converter circuit, the other terminal of the third capacitor is electrically coupled to a negative terminal of the fifth diode and a positive terminal of the sixth diode, one terminal of the fourth capacitor is electrically coupled to a negative terminal of the sixth diode and is electrically coupled to the two paths of LED light bars via a first connector, the other terminal of the fourth capacitor is grounded, one terminal of the fifth capacitor is electrically coupled to a negative terminal of the seventh diode and is electrically coupled to the two paths of LED light bars via a second connector, the other terminal of the fifth capacitor is electrically coupled to a positive terminal of the eighth diode and is electrically coupled to the two paths of LED light bars via the second connector.

5. The LLC backlight driving control circuit of claim 4, wherein the third capacitor is a capacitor for balancing the light bar voltage difference;
the fifth diode, the sixth diode, the seventh diode, and the eighth diode are output bridge rectifier diodes;
the fourth capacitor and the fifth capacitor are output filter capacitors.

6. The LLC backlight driving control circuit of claim 2, wherein the control circuit comprises a seventh resistor and a controller;
the seventh resistor is a current sampling resistor, one terminal of the seventh resistor is electrically coupled to one terminal of the controller and is electrically coupled to the two paths of LED light bars via a first connector, the other terminal of the seventh resistor is grounded, the other terminal of the controller is electrically coupled to an input terminal of the LLC resonant converter circuit.

7. The LLC backlight driving control circuit of claim 6, wherein the controller acquires an LED current by a voltage of the seventh resistor and adjusts an output signal of the controller, so as to adjust an output of the LLC resonant converter circuit.

\* \* \* \* \*